3,464,849
COATING PROCESS
Raymond J. Ehrig, Barrington, Ill., and Tien-Sung Lin, Philadelphia, Pa., assignors to W. R. Grace & Co., New York, N.Y., a corporation of Connecticut
No Drawing. Filed Mar. 21, 1967, Ser. No. 624,709
Int. Cl. B44d 1/36
U.S. Cl. 117—132                        4 Claims

ABSTRACT OF THE DISCLOSURE

A process for coating an iron-containing surface comprising contacting said surface with an aqueous acidic solution of an N-3-oxohydrocarbon-substituted acrylamide in the presence of an aqueous soluble hydroperoxide under ambient conditions to form an N-3-oxohydrocarbon-substituted acrylamide polymer coating on said surface.

---

This invention relates to a coating process. More particularly, this invention relates to a method for coating a metal substrate with an N-3-oxohydrocarbon-substituted acrylamide polymer by a redox couple process from a solution of the monomer.

N-3-oxohydrocarbon-substituted acrylamide polymers are well known in the art. See U.S. 3,277,056 wherein the method of making said monomers is well documented. The polymer formed from such a process is formed in solution and not as a coating on an iron containing substrate.

One object of the instant invention is to form an N-3-oxohydrocarbon-substituted acrylamide polymer coating on an iron-containing substrate. Other objects will be obvious from a reading hereinafter.

In summary, the invention consists of a process for forming a polymeric coating on an iron-containing substrate which comprises contacting an iron-containing substrate with an aqueous acidic solution of monomeric N-3-oxohydrocarbon-substituted acrylamide having the structural formula:

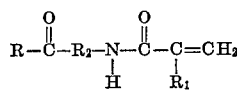

wherein R and $R_1$ are each selected from the class consisting of hydrogen and lower alkyl radicals and $R_2$ is selected from the class consisting of ethylene and a lower alkyl substituted ethylene radical in the presence of an aqueous soluble hydroperoxide under ambient conditions and recovering N-3-oxohydrocarbon-substituted acrylamide polymer as a coating on the iron-containing substrate.

The lower alkyl radicals in the acrylamide are those containing not more than about 10 carbon atoms and include also the cycloalkyl radicals. They are exemplified by methyl, ethyl, propyl, isopropyl, butyl, sec-butyl, n-pentyl, cyclohexyl, cyclopentyl, isooctyl, n-decyl, and 4-ethyl-2-hexyl radicals.

The radical $R_2$ is ethylene or an ethylene radical having at least one lower alkyl substituent on the carbon atom which is attached directly to the nitrogen atom of the acrylamide. For purposes of convenient reference, the two carbon atoms of the principal chain of the ethylene radical are designated numerically beginning from the nitrogen atom, i.e., the carbon atom attached directly to the nitrogen atom is designated as atom number 1 and the other as atom number 2. Thus, the $R_2$ radicals are illustrated by ethylene, 1-methyl ethylene, 1,1-dimethyl ethylene, 1,1,2-trimethyl ethylene, 1-methyl-1-ethyl ethylene, 1-methyl-1-isobutyl ethylene, 1-ethyl-1-isopropyl ethylene, 1,1-diisopropyl ethylene, 1,2-dimethyl ethylene, 1-n-butyl-1-n-pentyl ethylene, 1-methyl-1-cyclohexyl ethylene, etc.

The radical $R_1$ is preferably a hydrogen radical. In some instances it may be a lower alkyl radical such as illustrated previously.

Specific examples of the N-3-oxohydrocarbon-substituted acrylamides include but are not limited to:

N-3-oxopropyl acrylamide,
N-3-oxobutyl acrylamide,
N-3-oxo-1-methyl-butyl acrylamide,
N-3-oxo-1,1-dimethyl-butyl acrylamide,
N-3-oxo-1-methyl-1,3-dicyclohexyl-propyl acrylamide,
N-3-oxo-1,2-dimethyl-1-ethyl-butyl acrylamide,
N-3-oxo-1,5-dimethyl-1-isopropyl-hexyl acrylamide,
N-3-oxo-1,1-diisobutyl-2-isopropyl-5-methyl-hexyl acrylamide,
N-3-oxo-1,1-dibutyl-2-n-propyl-heptyl acrylamide,
N-3-oxo-1-methyl-butyl-alpha-methyl acrylamide, etc.

Although all of the N-3-oxohydrocarbon-substituted acrylamides taught above have been found operable in the instant invention, for purposes of clarity N-3-oxo 1,1-dimethyl-butyl acrylamide of the formula:

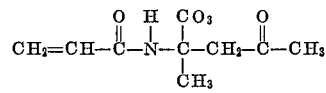

also referred to herein as diacetone acrylamide will be referred to in explaining the invention hereinafter. Thus, whenever N-3-oxo-1,1-dimethyl-butyl acrylamide (diacetone acrylamide), is referred to herein, it includes all of the N-3-oxohydrocarbon-substituted acrylamides within the structural formula set out supra.

The amount of N-3-oxohydrocarbon-substituted acrylamide monomer dissolved in an aqueous bath is an amount sufficient to give a 0.001 to 10 molar solution, preferably 0.5 to 2.0 molar solution. The monomers used in the instant invention are water soluble and also soluble in most organic solvents. However, homopolymers formed therefrom are water insoluble.

As used herein, the term "iron-containing substrate or surface" includes iron, steel and alloyed steel.

The coating process of the instant invention is usually performed at temperatures in the range 0 to 60° C., preferably room temperature, i.e., 20 to 30° C.

The coating reaction can be carried out for varying periods of time ranging from 1 second to 5 hours, preferably 0.5 to 10 minutes.

The coating reaction is carried out in an aqueous acidic solution of the monomer having a pH in the range 1.0 to 6.0. The pH can be adjusted by the use of conventional mineral acids such as sulfuric acid, nitric acid and hydrochloric acid and other mineral acids well known to those skilled in the art.

In practicing the instant invention it is necessary to add a water soluble hydroperoxide to the aqueous solution to set up the redox couple. Aqueous soluble hydroperoxides such as hydrogen peroxide, t-butyl-hydroperoxide, cumene hydroperoxide and 2,5-dimethylhexane-2,5-dihydroperoxide are operable in the instant invention. The hydroperoxide is added in an amount in the range 0.01 to 1.0 percent by weight of the aqueous monomer solution.

The pH value is very critical in the process of the instant invention. For example, no coating is obtained on the iron-containing surface in a neutral solution. On the other hand, rust will occur on the iron-containing surface if the hydrogen ion concentration is too high.

Furthermore, it can be seen from the examples hereinafter that the more concentrated the monomer solution within the limits set out, the more uniform the coating. However, a more dilute monomer solution yields more polymer on the surface than a concentrated solution at the same values of peroxide, hydrogen ion and contact time. This will be shown by examples hereinafter.

The amount of hydrogen-substituted peroxide added to the aqueous monomer solution does not affect the amount of polymer coated on the iron containing surface.

Since increasing the hydrogen ion concentration increases the amount of coating on an iron containing surface, the mechanism of the polymerization appears by redox couple as follows:

$$Fe + 2H^+ \rightarrow Fe^{++} + H_2$$

$$Fe^{++} + H_2O_2 \rightarrow OH^- + Fe^{+++} + HO\cdot$$

$$HO\cdot + monomer \rightarrow HOM\cdot \rightarrow polymer$$

The first reaction above was evidenced by the fact that in one example the polymer coating occurred only on that part of the iron-containing surface which had been wetted with a 0.1 N $H_2SO_4$ when the iron-containing sheet was dipped in a neutral monomer solution in the presence of 0.15% hydrogen peroxide. The same results were obtained when the acids were HCl and $HNO_3$.

In practicing the instant invention it has been found that optimum adhesion is obtained when the surface of the iron-containing substrate is freed from grease and rust by washing in a soap solution followed by slight roughening and then an acid wash.

The following examples will aid in explaining but will in no way limit the instant invention. Unless otherwise specified all parts and percentages are by weight. Additionally, the iron-containing substrate unless otherwise specified was always immersed in the monomer solution so that the area coated was 25.0 cm.², i.e., a strip 2.5 x 5 cm.

EXAMPLE 1

An iron strip 2.5 cm. x 5 cm. x 0.13 mm. thick was cleaned with a soap solution, roughened and dipped in a 3% aqueous HF solution followed by air drying. The clean iron strip was then dipped into 50 ml. of a 1 molar solution of diacetone acrylamide of the formula

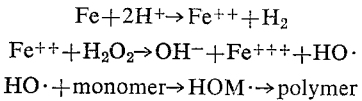

containing 0.2 ml. of 30% hydrogen peroxide and 1 ml. of 0.1 N sulfuric acid solution. The solution had a pH of 2.7. Polydiacetone acrylamide formed directly on the iron surface at room temperature and the metal was completely covered in 30 seconds. The coated iron strip was removed from the solution, washed with water and air dried. After scraping off part of the coating with a razor blade, the metal was dipped into a 3% solution of hydrofluoric acid. The uncoated portion of the metal exhibited rusting within 5 minutes whereas the coated surface showed no signs of corrosion.

The following examples in Table I show the effects of varying the pH, hydroperoxide concentration and dipping time on the amount of polymer coated on an iron-containing substrate. In all examples, an iron strip having a coatable surface area of 25.0 cm.² was used as the substrate. Diacetone acrylamide was used as the monomer in an aqueous solution. After the monomer solution was made up hydrogen peroxide was added, the pH was adjusted by the addition of $H_2SO_4$, and the iron strip was immersed.

TABLE I

[40 ml. of 0.2 M diacetone acrylamide]

| Example No. | 7.5% $H_2O_2$ (ml.) | 0.1 N $H_2SO_4$ (ml.) | pH | Dipping time (min.) | Polymer gained (mg./25 cm.²) |
| --- | --- | --- | --- | --- | --- |
| 2 | 0.25 | 0.5 | 2.9 | 1 | 3 |
| 3 | 0.25 | 0.5 | 2.9 | 2 | 4 |
| 4 | 0.25 | 0.5 | 2.9 | 3 | 10 |
| 5 | 0.25 | 1.0 | 2.6 | 1 | 1 |
| 6 | 0.25 | 1.0 | 2.6 | 2 | 15 |
| 7 | 0.50 | 1.0 | 2.6 | 1 | 5 |
| 8 | 0.50 | 1.0 | 2.6 | 2 | 8 |
| 9 | 0.50 | 2.0 | 2.3 | 2 | 13 |

The following examples in Table II show the effect of various concentrations of hydrogen substituted peroxide, pH and dipping time on a more concentrated monomeric solution of diacetone acrylamide. The examples were performed using the same procedure used for the examples in Table I.

TABLE II

[40 ml. of 2 M diacetone acrylamide]

| Example No. | 7.5% $H_2O_2$ (ml.) | 0.1 N $H_2SO_4$ (ml.) | pH | Dipping time (min.) | Polymer gained (mg./25 cm.²) |
| --- | --- | --- | --- | --- | --- |
| 10 | 0.25 | 0.5 | 2.9 | 1 | 3 |
| 11 | 0.25 | 0.5 | 2.9 | 3 | 5 |
| 12 | 0.25 | 1.0 | 2.6 | 1 | 5 |
| 13 | 0.25 | 1.0 | 2.6 | 2 | 6 |
| 14 | 0.50 | 1.0 | 2.6 | 1 | 5 |
| 15 | 0.50 | 1.0 | 2.6 | 2 | 6 |
| 16 | 0.50 | 2.0 | 2.3 | 1 | 8 |
| 17 | 0.50 | 2.0 | 2.3 | 2 | 9 |

From Tables I and II, it can be seen that the amount of hydrogen peroxide added to the aqueous monomer solution did not affect the polymer gained on the iron substrate as shown by comparing Example 5 with Example 7, Example 6 with Example 8, Example 12 with Example 14, and Example 13 with Example 15.

The concentrated diacetone acrylamide solution gave a more uniform coating than the dilute solution. However, the dilute monomer solution exemplified in Table I gave more polymer on the surface than the concentrated one at the same values of hydroperoxide, hydrogen ion and dipping time as can be seen by a comparison of Tables I and II.

The coating process of the instant invention is useful in coating iron-containing metal substrates to protect them from abrasion, corrosion and oxidation.

What is claimed is:

1. A process for forming a polymeric coating from a monomeric N-3-oxohydrocarbon-substituted acrylamide having the structural formula:

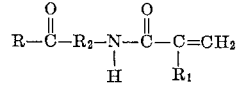

wherein R and $R_1$ are each selected from the class consisting of hydrogen and lower alkyl radicals and $R_2$ is selected from the class consisting of ethylene and a lower alkyl-substituted ethylene radical on an iron-containing substrate which comprises contacting said iron-containing substrate with a 0.001 to 10 molar aqueous solution of the aforesaid monomer, said solution having a pH in the range 1–6.0 and containing 0.01 to 1.0 percent by weight of the aqueous monomer solution of an aqueous soluble hydroperoxide under ambient conditions, recovering N-3-oxohydrocarbon-substituted acrylamide polymer as a coating on the iron-containing substrate and drying the thus recovered polymer.

2. The process according to claim 1 wherein the coating process is performed at a temperature in the range 0 to 60° C.

3. The process according to claim 1 wherein the monomer is diacetone acrylamide.

4. The process according to claim 1 wherein the hydroperoxide is hydrogen peroxide.

References Cited

UNITED STATES PATENTS

| | | | |
|---|---|---|---|
| 2,978,437 | 4/1961 | Christenson | 117—132 X |
| 3,277,056 | 10/1966 | Coleman | 260—80.73 X |
| 3,344,097 | 9/1967 | Flegenheimer | 117—132 X |

WILLIAM D. MARTIN, Primary Examiner

W. R. TRENOR, Assistant Examiner

U.S. Cl. X.R.

117—49; 260—561, 80.73.